United States Patent

[11] 3,550,951

| [72] | Inventor | Ansalem O. Cobbs |
| | | Des Moines, Iowa |
| [21] | Appl. No. | 757,632 |
| [22] | Filed | Sept. 5, 1968 |
| [45] | Patented | Dec. 29, 1970 |
| [73] | Assignee | Cobbs Manufacturing Company |
| | | Des Moines, Iowa |
| | | a corporation of Iowa |

[54] MOTOR VEHICLE DOOR GUARD
1 Claim, 3 Drawing Figs.

[52] U.S. Cl. ..................................... 296/152,
293/1, 49/462
[51] Int. Cl. ...................................... B60r 27/00
[50] Field of Search ........................................... 296/152;
293/54D, 621; 49/462

[56] References Cited
UNITED STATES PATENTS

| 3,371,447 | 3/1968 | Ruff | 293/54D |
| 3,382,615 | 5/1968 | Adell | 293/54D |
| 2,226,615 | 12/1940 | Killen | 293/54D |

Primary Examiner—Philip Goodman
Attorney—Henderson & Strom

ABSTRACT: This invention relates to a flexible door guard suitable for frictional engagement with the outer flanged portion of motor vehicle doors. This door guard comprises a back wall and two sidewalls depending from the back wall. The back wall and sidewalls define a channel-shaped area wherein the distance between the innermost faces of the sidewalls, measured parallel of the innermost face of the back wall, is greater proximate the innermost face of the back wall than distal of the innermost face of the back wall.

PATENTED DEC 29 1970

3,550,951

INVENTOR
ANSALEM O. COBBS
BY
Henderson & Strom
ATTORNEYS

MOTOR VEHICLE DOOR GUARD

BACKGROUND OF THE INVENTION

This invention relates to a flexible door guard which can be frictionally engaged with the outer flanged portion of substantially all motor vehicles.

The problem of preventing inadvertent damage to the motor vehicles of others when opening motor vehicle passenger doors has increased with increased motor vehicle traffic, the advent of huge parking lots, and the removal by motor vehicle manufacturers of substantially all protective trim from the sides of newer motor vehicles. Manufacturers have provided metal trim on the outer flanged portions of some motor vehicle doors which adequately protects that motor vehicle but which may scratch, dent or otherwise damage motor vehicles of others if the doors are carelessly opened. Additionally, this metal trim must be specifically designed for every make and model of motor vehicle and must be bolted or riveted to the outer flanged portions of the motor vehicle door.

SUMMARY OF THE INVENTION

This invention relates to a one-piece, flexible door guard suitable for frictional engagement with the outer flanged portion of motor vehicle doors comprising a back wall and two sidewalls depending from the back wall; the back wall and the sidewalls defining a substantially channel-shaped area wherein the distance between the innermost faces of the sidewalls, measured parallel of the innermost face of the back wall, is greater proximate the innermost face of the back wall than distal of the innermost face of the back wall.

It is an object of this invention to provide an improved flexible door guard for motor vehicles.

It is another object of this invention to provide a door guard which can be frictionally engaged with the outer flanged portion of substantially all motor vehicle doors.

DESCRIPTION OF THE PREFERRED EMBODIMENT

Figure 1:
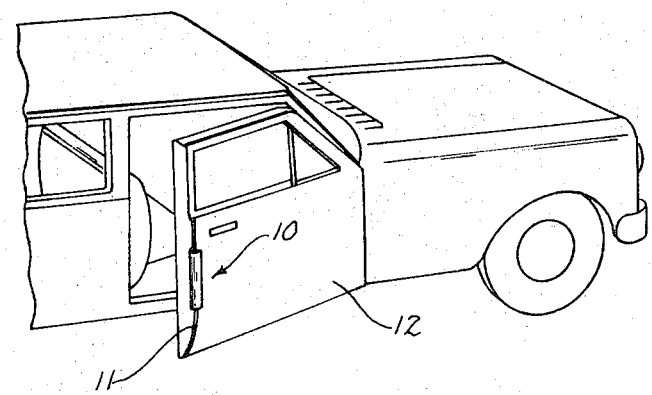
FIG. 1 is a perspective view of the door guard of this invention shown in frictional engagement with the outer flanged portion of a motor vehicle door.

Referring now to the drawings, the one piece flexible door guard of this invention is indicated generally at 10 in FIG. 1. The door guard 10 is adapted for frictional engagement with the outer flanged portion 11 of a motor vehicle door 12 and is preferably frictionally engaged on that part of the flanged portion 11 which would first contact other motor vehicles, walls, etc. when the door 12 of the motor vehicle is opened.

Figure 3:
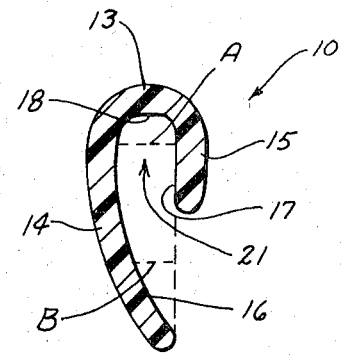
FIG. 3 is a cross-sectional view as taken along the line 3-3 of FIG. 2.

The door guard 10 is comprised of a back wall 13 (FIG. 3) and two sidewalls 14, 15 depending from the back wall. The first sidewall 14 has an innermost face 16 of arcuate configuration while the second sidewall 15 has an innermost face 17 of plane configuration. The plane configured faced 17 of the second sidewall 15 is substantially perpendicular of the innermost face 18 of the back wall 13.

The back wall 13 and the sidewalls 14, 15 of the door guard define a substantially channel-shaped area 21 wherein the distance between the innermost faces 16, 17 of the sidewalls 14, 15 measured parallel of the innermost face 18 of the back wall 13, as indicated by dashed lines A and B, is greater proximate the innermost face 18 of the back wall 13, or at A, than distal of the innermost face 18 of the back wall 13 at B.

The distance of A between the innermost faces 16, 17 of the sidewalls 14, 12, measured as described above, proximate the innermost face 18 of the back wall 13 is preferably substantially the same as the width of the outer flanged portions 11 of motor vehicle doors 12. These flanged portions 11 generally range in width from about 0.15 inches to about 0.25 inches.

The distance B is less than the distance A because of the concave, inwardly curving face 16 of the first sidewall 14. The distance B generally ranges from about 0.01 inches to about 0.20 inches.

This relationship of the first sidewall 14 with the second sidewall 15 affords a gripping action on the outer flanged portion 11 of the motor vehicle door 12 and secures the door guard 10 in frictional engagement with the outer flanged portion thereof. Therefore, the need for securing means for the door guard 10 such as rivets, bolts, or screws, and the attendant labor costs, are eliminated.

Figure 2:
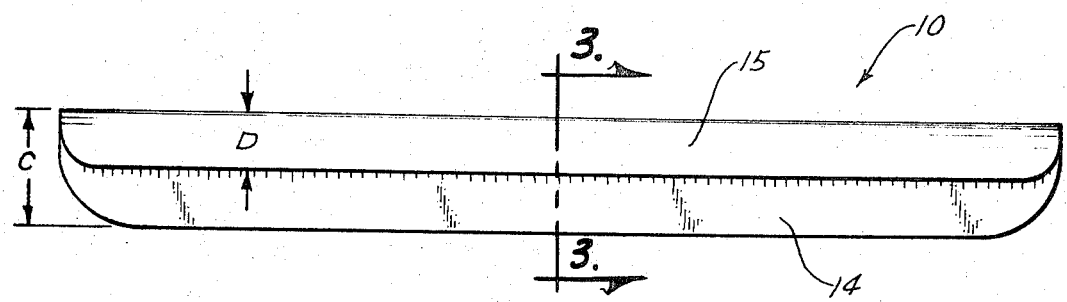
FIG. 2 is a side elevational view of the door guard of this invention.

In this invention, it is also preferred that the first sidewall 14 having an innermost face 16 of arcuate configuration have a length perpendicular of the innermost face 18 of the back wall 13 in a ratio of the length C (FIG. 2) of the first sidewall 14 to the length D of the second sidewall 15 of from 3:1 to about 1.5:1. The increased length of the first sidewall 14 facilitates placement and final engagement of the door guard 10 with the outer flanged portion 11 of motor vehicle doors 12. The longer first sidewall 14, as described above, is preferably placed on the outside of the outer flanged portion 11 of the motor vehicle door 12 as illustrated in FIG. 1 and, therefore, provides more protection to that motor vehicle and to other motor vehicles.

The door guard 10 of this invention can be manufactured from any flexible, relatively nonabrasive material such as polyethylene. The flexible nature of this door guard renders it readily adaptable for use on nearly all makes and models of motor vehicles. The width of the back wall 13 and sidewalls 14, 15 should generally range from about 0.10 inches to about 0.20 inches to allow the motor vehicle doors 12 to be readily closed.

Although a preferred embodiment has been described hereinbefore, it is to be remembered that various modifications may be made without departing from the invention as defined in the appended claims.

I claim:

1. A one-piece flexible door guard suitable for frictional engagement with the outer flanged portion of motor vehicle doors, comprising: a back wall and two sidewalls depending from said back wall; said back wall and said sidewalls defining a substantially channel-shaped area wherein the distance between the innermost faces of said sidewalls, measured parallel of the innermost face of the back wall, is greater proximate the innermost face of the back wall than distal of the innermost face of said back wall; wherein the innermost face of a first said sidewall is of arcuate configuration; and wherein the second sidewall has an innermost face of plane configuration, said innermost face of said second sidewall being perpendicular of the innermost face of said backwall;

and further wherein said first sidewall having an innermost face of arcuate configuration has a length perpendicular of said innermost face of said back wall in a ratio of the length of said first sidewall to the length of said second sidewall ranging from about 3:1 to about 1.5:1.